Dec. 12, 1967  AKIRA OTSUKA  3,357,653
END FASTENER
Filed July 1, 1966  3 Sheets-Sheet 1
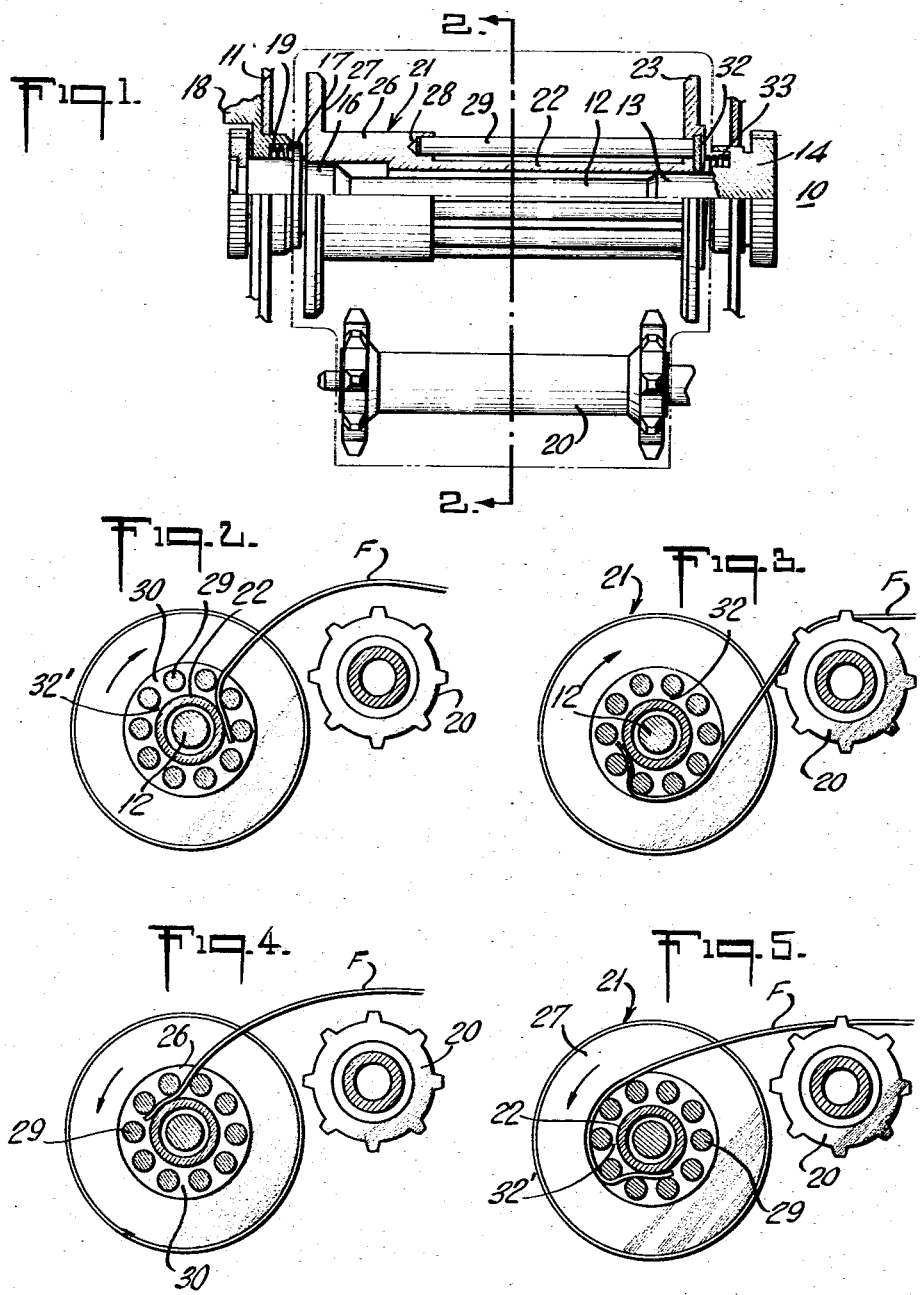
INVENTOR.
AKIRA OTSUKA
BY Stanley Wolder
ATTORNEY

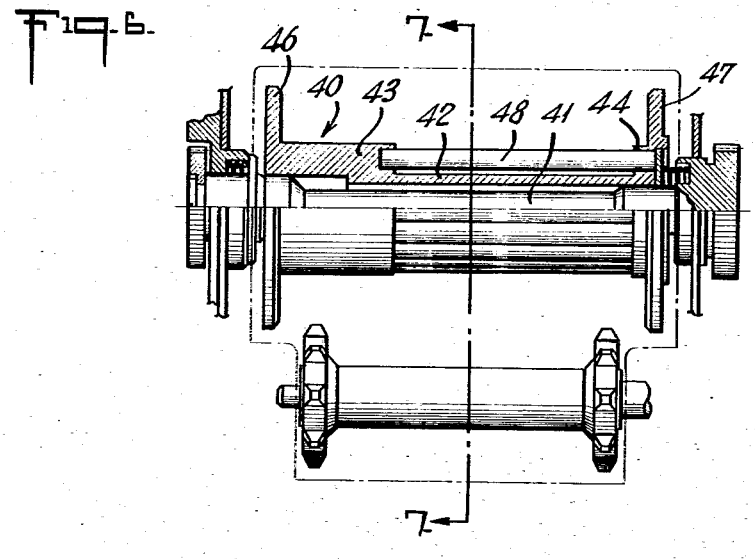
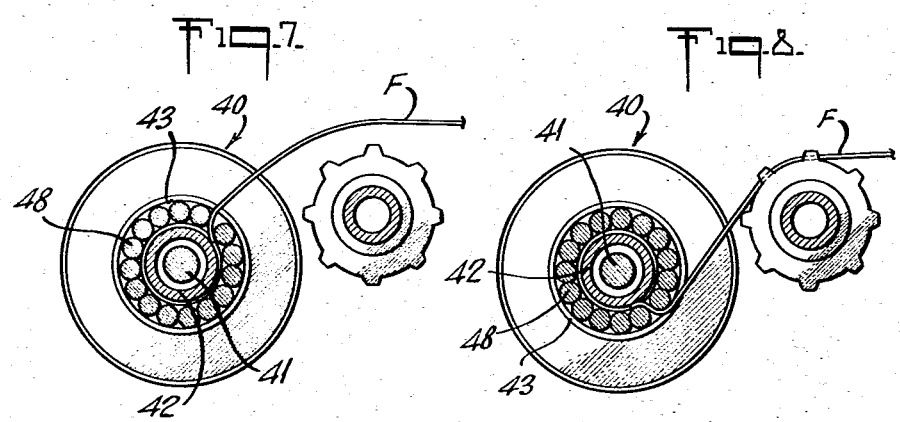

Dec. 12, 1967  AKIRA OTSUKA  3,357,653
END FASTENER
Filed July 1, 1966  3 Sheets-Sheet 3
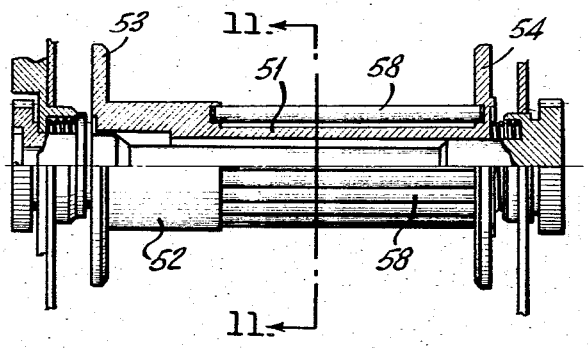
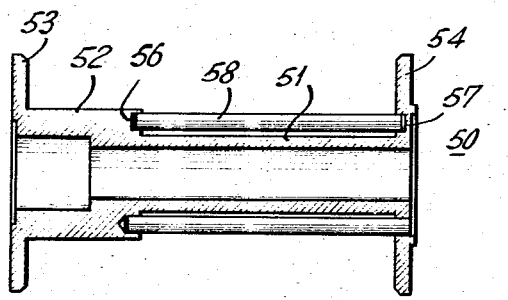
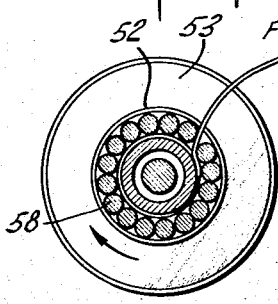
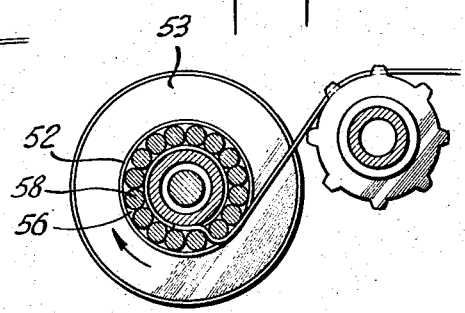
INVENTOR.
AKIRA OTSUKA
BY Stanley Wolder
ATTORNEY

United States Patent Office 3,357,653
Patented Dec. 12, 1967

3,357,653
END FASTENER
Akira Otsuka, Kitaadachi-gun, Saitama-ken, Japan, assignor to Asahi Kogaku Kogyo Kabushiki Kaisha, Tokyo-to, Japan, a corporation of Japan
Filed July 1, 1966, Ser. No. 562,318
Claims priority, application Japan, Feb. 25, 1966, 41/11,101
8 Claims. (Cl. 242—74)

ABSTRACT OF THE DISCLOSURE

A camera film take-up includes a spool comprising a hub terminating in circular end members which support a plurality of circumferentially spaced longitudinal rods spaced from and coextensive with the hub and extending between the end members. Alternatively, the rods may be circumferentially movable about the hub to effect the separation of a pair of adjacent rods. A film tail inserted between a pair of rods into contact with the hub effects a releasably firm anchoring of the film upon rotation of the spool.

---

The present invention relates generally to improvements in photographic cameras and it relates more particularly to a film take-up spool provided with improved means for engaging the leading end or tail of a length of film or a paper leader associated with the film to facilitate the loading of the camera.

The loading of film in a conventional camera, particularly a camera of the 35 millimeter type, is a tedious, inconvenient and time consuming procedure which requires some degree of skill. It is a frequent occurrence among inexperienced amateurs to improperly load the film by not properly effecting an engagement of the tail of the film by the take-up reel or spool with the result that the film is not advanced, or improperly advanced with a resulting failure in the exposure of the successive film frames. The conventional camera take-up spool is provided along its stem with a spring clip or a longitudinal slot or the like for engaging the tail of the film to permit the take-up of the film, and the release of the tail upon rewinding. However, these arrangements possess numerous drawbacks and disadvantages. The proper engagement between the film tail and the slot is a difficult procedure requiring considerable care, an improper engagement resulting in an inadequate advance of the film on the one hand or on the other hand, an improper release of the rewound film which may lead to excessive tension and damage to the film.

It is, therefore, a principal object of the present invention to provide a photographic camera having an improved film loading mechanism.

Another object of the present invention is to provide an improved film take-up device in photographic cameras.

Still another object of the present invention is to provide in photographic cameras a film take-up spool having an improved arrangement for releasably engaging the tail of a film.

A further object of the invention is to provide an improved film engaging take-up spool which is adaptable for use with conventional cameras.

Still a further object of the present invention is to provide a film take-up spool of the above nature characterized by its reliability, ease and convenience of use with a minimum of skill, and its ready and easy release of the film upon rewinding thereof.

The above and other objects of the present invention will become apparent from a reading of the following description taken in conjunction with the accompanying drawings, wherein:

FIGURE 1 is a plan view, partially in section, of a film take-up mechanism embodying the present invention;

FIGURE 2 is a sectional view taken along line 2—2 in FIGURE 1 illustrating the film in the initially engaged position of a clockwise advancing take-up spool;

FIGURE 3 is a view similar to FIGURE 2 showing the take-up spool in an advanced position;

FIGURE 4 is a view similar to FIGURE 2, the take-up spool being advanced counterclockwise;

FIGURE 5 is a view similar to FIGURE 4 showing the take-up spool in an advanced position;

FIGURE 6 is a view similar to FIGURE 1 of another embodiment of the present invention;

FIGURE 7 is a sectional view taken along line 7—7 in FIGURE 6, illustrating the film in the initially engaged position of a clockwise advancing take-up spool;

FIGURE 8 is a view similar to FIGURE 7 showing the take-up spool in an advanced position;

FIGURE 9 is a view similar to FIGURE 1, of still another embodiment of the present invention, the associated sprocket wheels not being shown;

FIGURE 10 is a medial longitudinal sectional view of the take-up spool;

FIGURE 11 is a sectional view taken along line 11—11 in FIGURE 9, illustrating the film in the initially engaged position of a clockwise advancing take-up spool; and FIGURE 12 is a view similar to FIGURE 11 showing the take-up spool in an advanced position.

In a sense, the present invention contemplates, in a photographic camera, the provision of a film take-up spool, a plurality of longitudinally extending parallel rods carried by and extending circumferentially about said spool, at least one pair of adjacent of said rods being transversely spaced a first distance sufficient for receiving a tail of said film therebetween and to effect engagement of said tail by said spool upon rotation thereof as a consequence of the flexibility and resiliency of said tail, and means for rotating said spool. The spool includes an axially extending stem closely spaced to the inner faces of the rods and the distance between the pair of adjacent rods advantageously does not exceed about 1.8 millimeters and the distance between the spool stem and rods is advantageously less. The rods may be circumferentially spaced from each other and fixed to the spool or they may all be circumferentially movable or one or more of them may be affixed to the spool.

Referring now to the drawings and more particularly FIGURES 1 to 6 thereof which illustrate a preferred embodiment of the present invention, the reference numeral 10 generally designates the improved film take-up mechanism which is housed in the body 11 of a camera at a position following the framing window thereof, in the known manner. The take-up mechanism 10 includes a shaft 12 suitably journalled in the body member 11 and provided at one end thereof with a first enlarged section 13 terminating in an enlarged head 14 and at the other end with a second enlarged section 16 having a peripheral flange 17. A suitable actuated advancing gear 18 rotatably registers with the shaft section 16 outside the flange 17 and is provided with an annular recess which houses a coupling spring 19 one end of which is secured to the gear 18 and the other end of which bears on the flange 17 to define a one way clutch permitting the rotation of the shaft 12 by the coupled gear 18 in one direction and the free uncoupled return of the gear 18 in an opposite direction. A sprocket drum 20 is associated with the take-up mechanism 10 in the known manner and is advanced with the gear 18.

A tubular take-up spool 21 is coaxial with and rotatably mounted on and supported by the shaft 12 and includes a stem section or axial hub 22 of reduced cross-section terminating at one end in a first peripheral flange or end member 23 and at its other end in a stepped or enlarged section or end member 26 provided with an outer peripheral flange 27. The enlarged stem section 26 engages the enlarged shaft section 16 and the opposite end of the stem 22 engages the shaft section 13.

Formed in the inner face or shoulder of the stem section 26 are a plurality of regularly circumferentially spaced longitudinal cylindrical wells 28 and formed in the flange 23 are apertures similarly shaped to and in longitudinal alignment with the wells 28. Extending between and supported by each pair of wells 28 and aligned aperture is a cylindrical rod 29 to provide a plurality of regularly circumferentially spaced rods 29 which delineate between successive rods corresponding longitudinal passageways 30. The rods 29 are locked against longitudinal movement by a disc 32 fitted in an end well formed in the flange 23 to block the ends of the rod engaging apertures. The inner peripheries of the rods 29 are spaced from the outer periphery of the stem 22 by longitudinal passageways 32'. The passageways 30 are of a width sufficient to receive and allow the insertion and passage of the tail F of a film which may be a trimmed part of the film itself or may be a leader from a paper backing carrying the photographic film. The passages 32 are likewise wide enough to permit the insertion and passage of the film tail and is advantageously of a lesser width than the passageways 30. Furthermore, the passageways 30 and 32' and the rods 29 are so dimensioned that consequent to the toughness, flexibility and resiliency of the film tail, the insertion of the film tail F through a passageway 30 and one or more pasageways 32' effects a firm engagement of the film tail F upon rotation of the spool 21 in either direction and releases the film tail F as the film is unwound and pulled from the spool longitudinally.

In order to effect the rotation of the spool 21 by rotation of the shaft 12, as aforesaid, a helical compression spring 33 is compressed and entrapped between confronting faces of the disc 32 and the shaft head 14 and partially nested in an annular well formed in the shaft head 14. Thus the spool 21 is friction driven by the shaft 12 through the spring coupling 33. It should be noted that whereas the rods 29 are illustrated as of circular transverse cross section they may be of other cross section, for example, elliptical, spindle, or other preferably curvilinear shape.

As an example of a take-up mechanism which operates highly satisfactorily with conventional 35 millimeter film, the diameters of the head 26, rods 29 and stem 22 are 12.5 millimeters, 2 millimeters and 6.6 millimeters respectively. The space between successive rods 29, that is the width of the passageways 30, is 0.9 millimeter and the width of the passageway 32', that is the space between the rods 29 and the stem 22, is 0.5 millimeter.

Considering now the operation of the take-up mechanism described above, when the spool 21, in take-up, is rotated in a clockwise direction as illustrated in FIGURES 2 and 3, the film tail F is pulled over the sprocket drum 20 and inserted through a passageway 30 into one or more passageways 32 following clockwise the respective passageway 30. The spool 21 is then rotated clockwise by way of the shaft 12 to pull and wind the film, the film tail F taking a bite on a rod 29. The winding of the spool 21, winds the film, as shown in FIGURE 3 and draws the film sprocket openings into engagement with the sprocket drum 20 in the known manner to complete the loading of the film. It should, of course, be noted that a firm engagement of the film is also effected if the film tail F is passed through a passageway 30 into a trailing passageway 32' instead of a leading passageway 32 as illustrated. Moreover, it has been found that a firm engagement of the film tail F is effected even if the tail is not passed completely through any passageway 32. In rewinding the film, the film is pulled by the rewind spool to rotate the spool 21 counterclockwise and when the end of the film is reached it is released and easily pulled from engagement with the spool 21 without straining the film.

In FIGURES 4 and 5 there is illustrated the sequence of operation in which the take-up spool 21 is rotated counter-clockwise in advancing the film. In lacing the spool 21 the tail F is inserted through a passageway 30 into one or more of the next counterclockwise successive passageways 32, as seen in FIGURE 4. Upon rotation of the spool 21 a bite is taken on the film tail F, as seen in FIGURE 5, and the film is wound and drawn over the sprocket drum 20. As previously, firm engagement of the film tail F is effected when the tail F is inserted into clockwise successive passageways 32' or even if the tail F is not completely inserted into any of the passageways 32.

The embodiment of the present invention illustrated in FIGURES 6 to 8 differs from that above described only in the construction of the take-up spool and in all other respects is similar thereto. Specifically, the spool 40 is rotatably mounted on a shaft 41 which corresponds to the shaft 12 previously described and is rotated and drives the spool 40 in the manner of the shaft 12.

The spool 40 includes an axial stem 42 terminating at one end in an enlarged relatively long section 43 and at the other end in an enlarged relatively short section 44, the enlarged sections 43 and 44 being provided at their outer ends with peripheral flanges 46 and 47 respectively. Formed in the confronting faces of the enlarged sections 43 and 44 are annular coaxial longitudinally aligned grooves or tracks. A plurality of longitudinal, preferably circular, but not necessarily cylindrical rods 48, extend circumferentially about the stem 42 and are shortly spaced therefrom, the ends of the rods 48 slidably engaging the respective tracks to permit the free circumferential movement thereof. The track and rods 48 are so dimensioned and related that with the movement of the rods into side by side engagement, one pair of rods are spaced a distance to permit the insertion of a film tail in the passageway therebetween and thence into the passageway between the underface of the rod 48 and the periphery of the stem 42. In use with conventional 35 millimeter film, highly satisfactory operation has been experienced with the enlarged section 43, rods 48 and stem 42 having diameters of 12.5 millimeters, 2 millimeters and 4.0 millimeters respectively, and with the spacing between a pair of fully separated rods 48 and between the underface of the rods and the surface of the stem being 0.5 millimeter and 1.8 millimeters respectively.

One mode of operation of the mechanism last described and as employed with the conventional film tail of a 35 millimeter film, that is a tail of between ½ and ⅔ the width of the film itself, is illustrated in FIGURES 6 and 7. The film is advanced over the sprocket drum and the tail is inserted between a pair of rods 48 to effect their separation and then along the stem 42 beneath the clockwise one of the pair of rods 48. The rotation of the spool 40, clockwise, effects a firm engagement of the film tail, as seen in FIGURE 8, and the advance of the film and engagement of the sprocket drum. As in the earlier embodiment, a firm engagement of the film tail is effected when the spool is rotated clockwise or counter-clockwise, or the tail is inserted under a clockwise or counter-clockwise positioned rod 48, or if the film tail is not fully inserted between the stem 42 and a rod 48. Upon rewinding of the film the tail is readily released.

The embodiment of the present invention illustrated in FIGURES 9 to 12 differs from that last described only in that one of the spool rods is locked against circumferential movement. Specifically, the spool 50 includes an axial stem 51 provided at one end with an enlarged section 52 terminating in a peripheral flange 53 and at the other end is provided with a peripheral flange 54. Formed in the confronting faces of the enlarged section 52 and the flange 54 are coaxial longitudinally aligned annular grooves or tracks 56 and 57 respectively. A plurality of longitudinal, preferably circular, cylindrical rods 58 extend circumferentially about the spool 50, the ends of the rods 58 slidably engaging the corresponding tracks 56 and 57. One of the rods 58 is locked against circumferential movement along the tracks 56 and 57, being of greater length than the other rods 58 and engaging a corresponding bore formed in the flange 54. The rods 58 and the stem 51 are dimensioned and related in substantially the manner of the rods 48 and the stem 42.

The operation of the film take-up mechanism last described is similar to that previously described, one mode of such operation being illustrated in FIGURES 11 and 12 which correspond to that illustrated in FIGURES 7 and 8.

The employment of the improved take-up spool of the present invention permits the insertion and engagement of the film tail in a simple, easy and reliable operation. The mere insertion of the film tail between a pair of spaced or separable rods in any manner assures a positive engagement of the film tail independently of the direction of rotation of the spool. Further, upon unwinding, the film is readily released by the film tail with a minimum of tension or stress on the film. In addition, the spool is simple, rugged and inexpensive.

While there have been described and illustrated preferred embodiments of the present invention, it is apparent that numerous alterations, omissions and additions may be made without departing from the spirit thereof.

What is claimed is:

1. In a photographic camera, a film take-up spool including an axial hub terminating in peripheral end members, a plurality of longitudinally extending circumferentially located parallel rods carried by and extending between said end members and coextensive with and spaced from said hub, at least one pair of adjacent of said rods being transversely spaced a first distance sufficient for receiving a tail of said film therebetween and to effect engagement of said tail by said spool upon rotation thereof as a consequence of the flexibility and resiliency of said tail, and means for rotating said spool.

2. The photographic camera of claim 1 wherein said first distance between said pair of transversely spaced adjacent rods does not exceed approximately 1.8 millimeters.

3. The photographic camera of claim 1 wherein the distance between said rods and said hub is less than said first distance between said transversely spaced pair of rods and at least equal to the thickness of said tail.

4. The photographic camera of claim 1 wherein each of said rods is affixed to and rotatable with said spool and is transversely spaced a distance equal to said first distance from the next adjacent rod.

5. The photographic camera of claim 1 wherein each of said rods is affixed to and rotatable with said spool and transversely spaced a distance equal to said first distance from the next adjacent rod, the peripheral surface of said hub being spaced from the inner faces of said rods a second distance less than said first distance.

6. The photographic camera of claim 5 wherein said first distance is approximately 0.9 millimeter and said second distance is approximately 0.5 millimeter.

7. The photographic camera of claim 1 wherein at least some of said rods are circumferentially movable about said spool to separate a pair of adjacent of said rods a distance equal to said first distance.

8. The photographic camera of claim 7 including means for limiting the circumferential movement of said rods.

References Cited

UNITED STATES PATENTS 2,991,955    7/1961    Post _____ 242—74
3,265,318    8/1966    Ellmore _____ 242—74

STANLEY N. GILREATH, *Primary Examiner.*

N. L. MINTZ, *Examiner.*